United States Patent [19]
Jasper et al.

[11] Patent Number: 5,140,615
[45] Date of Patent: Aug. 18, 1992

[54] MAXIMAL RATIO DIVERSITY COMBINING TECHNIQUE

[75] Inventors: Steven C. Jasper, Hoffman Estates; Mark A. Birchler, Roselle, both of Ill.

[73] Assignee: Motorola, Inc., Schaumburg, Ill.

[21] Appl. No.: 663,777

[22] Filed: Mar. 4, 1991

Related U.S. Application Data

[63] Continuation of Ser. No. 536,839, Jun. 12, 1990, abandoned.

[51] Int. Cl.$^5$ ............................................. H04B 1/18
[52] U.S. Cl. ................................. 375/100; 375/102; 455/137
[58] Field of Search ............... 375/14, 39, 40, 98, 375/100, 101, 102; 455/52, 133, 134, 136, 137, 139

[56] References Cited

U.S. PATENT DOCUMENTS

| | | | |
|---|---|---|---|
| 3,633,107 | 1/1972 | Brady | 375/40 |
| 4,577,332 | 3/1986 | Brenig | 375/100 |
| 4,675,880 | 6/1987 | Davarian | 375/101 |
| 4,733,402 | 3/1988 | Monsen | 375/100 |
| 4,953,183 | 8/1990 | Bergmans et al. | 375/101 |

*Primary Examiner*—Benedict V. Safourek
*Assistant Examiner*—Young Tse
*Attorney, Agent, or Firm*—John W. Hayes

[57] ABSTRACT

A method for implementing diversity reception to counteract effects of channel fading on a transmitted information signal. In diversity receive paths, estimates of complex channel gain are computed based upon pilot symbols inserted from time to time in the transmitted information symbol stream. Phase corrected and weighted samples from the diversity paths are summed prior to the decision process. The squared magnitudes of the diversity path channel gains are summed to provide the proper threshold adjustment.

1 Claim, 2 Drawing Sheets

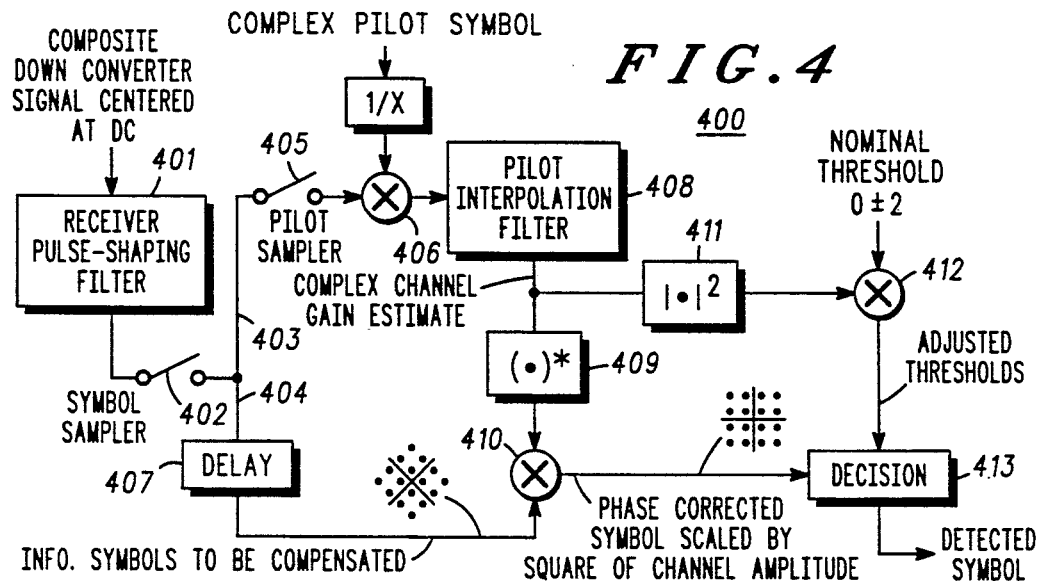
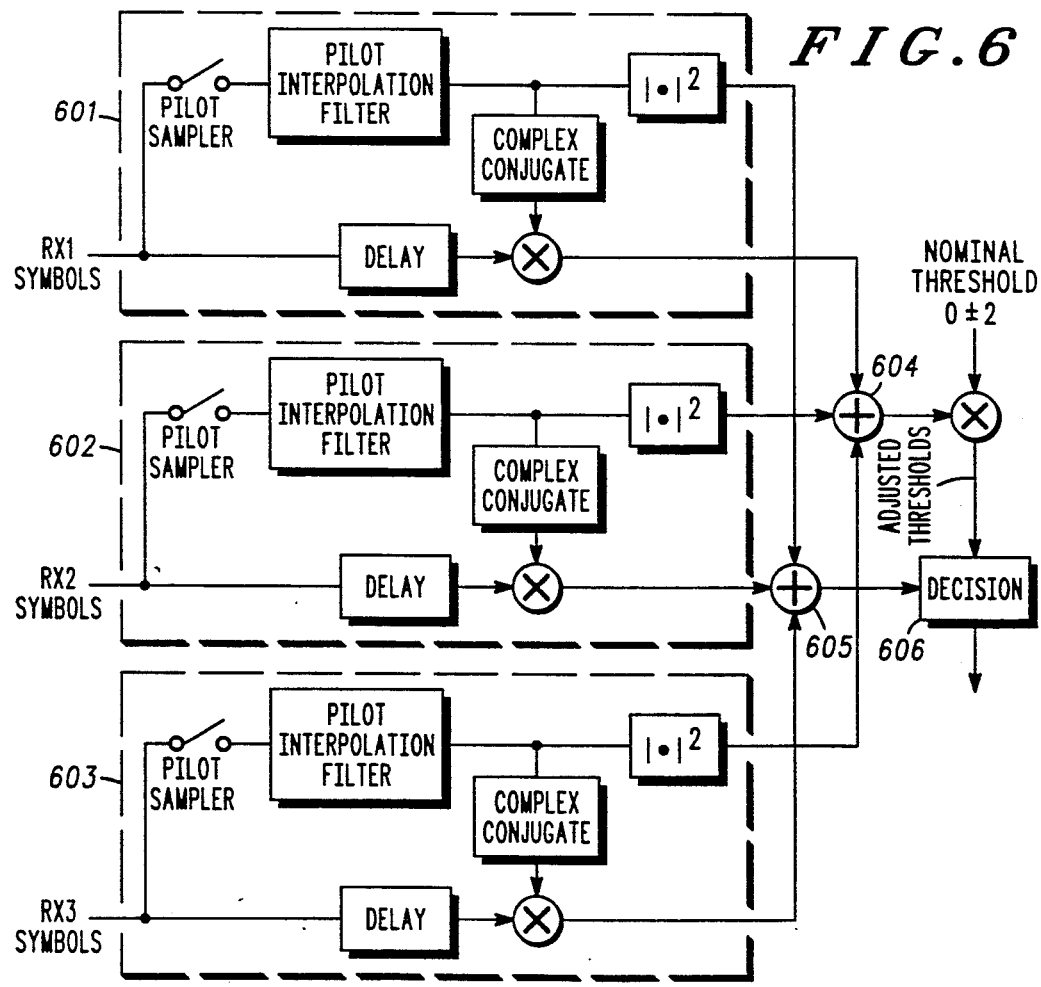

MAXIMAL RATIO DIVERSITY COMBINING TECHNIQUE

This is a continuation of application Ser. No. 07/536,839, filed Jun. 12, 1990, and now abandoned.

TECHNICAL FIELD

This invention relates generally to RF communication systems, and in particular to a diversity combining technique used to combat the effects of fading in RF communication systems.

BACKGROUND OF THE INVENTION

RF (radio frequency) communication systems are subject to fading phenomena which produce noise and distortion in received information signals. One approach to overcoming the effects of fading is the use of a diversity receiver system.

In a diversity system, more than one receive antenna is employed. Even if a signal fade occurs at one antenna, there is a finite probability that a signal of relatively strong amplitude will still be appearing at one or more of the other antennas in the diversity system. The use of multiple antennas allows the receiver to operate on two or more independent versions of the transmitted signal, and to combine or select these signals in such a way as to mitigate the effects of fading. The more independent the fading processes associated with each branch, the better the combiner performance.

A method well known in the art for combining these branch signals is called maximum ratio combining, or max-ratio. In the max-ratio technique, the branch signals are adjusted so that they are in phase, and then they are weighted in proportion to their individual signal-to-noise ratios before being summed. Of course, in utilizing this technique, a reference of some sort must be established in order to phase compensate the received signals. This reference is commonly established through the transmission of a pilot tone. A pilot tone is simply a signal that is transmitted at a frequency adjacent to the modulated signal, from which the carrier phase and amplitude are estimated. Unfortunately, the use of a pilot tone carries with it the disadvantage of an increase in the required transmission bandwidth, as well as a higher peak-to-average ratio of the transmitted signal. A pilot tone system is also susceptible to decorrelation between the pilot tone and the information bearing signal. This can lead to errors in the phase adjustment and weighting processes.

Accordingly, a need arises for a method for max-ratio combining in a diversity system which does not suffer from higher bandwidth requirements nor the decorrelation and peak to average problems associated with the separate pilot tone technique.

SUMMARY OF THE INVENTION

The above-described need is satisfied through a method for implementing diversity reception to counteract the effects of channel fading on a transmitted information signal. At a transmitter, one or more predetermined pilot symbols are inserted, from time to time, into a quadrature amplitude modulated (QAM) information stream, and an RF carrier is modulated with the QAM information stream to provide a transmitted signal. Within each diversity path of a receiver designed to receive the transmitted information signal, the received signal is demodulated and appropriately sampled to provide a sampled, demodulated signal. The pilot symbol samples and information symbol samples are separated, and the pilot symbol samples are processed at predetermined pilot sample times to determine estimates of complex channel gain at each pilot sample time. Since the information symbol sample rate is higher than the pilot symbol sample rate, the complex channel gains are interpolated to compute complex channel gain estimates for each information symbol sample time.

Each information symbol sample is then multiplied by the complex conjugate of the corresponding complex channel gain estimate to provide a phase corrected and weighted estimate of the transmitted information symbol, where the weighting is approximately the square of the amplitude of the complex channel gain. The square of the amplitude of the estimated complex channel gain is also calculated.

Then, operating on the outputs of the diversity receive paths, the phase corrected and weighted information symbol estimates are summed to provide a diversity combined information symbol estimate. By summing the squares of the amplitudes of the estimated complex channel gains, an estimate of composite weighting factor is derived. Using the composite weighting factor, a set of adjusted decision thresholds is derived, and estimates of the originally transmitted information symbols are obtained through comparing the diversity combined information symbol estimate to the adjusted decision threshold.

BRIEF DESCRIPTION OF THE DRAWINGS

FIG. 4 is a block diagram of a receiver designed for operation with a 16-QAM system which phase corrects received symbols based on the complex channel gain estimate and achieves symbol detection through adjusted thresholds in the manner taught by the present invention;

FIG. 6 is a block diagram illustrating the maximal ratio diversity combining technique of the present invention with three diversity receive paths.

DETAILED DESCRIPTION OF THE INVENTION

Figure 1:
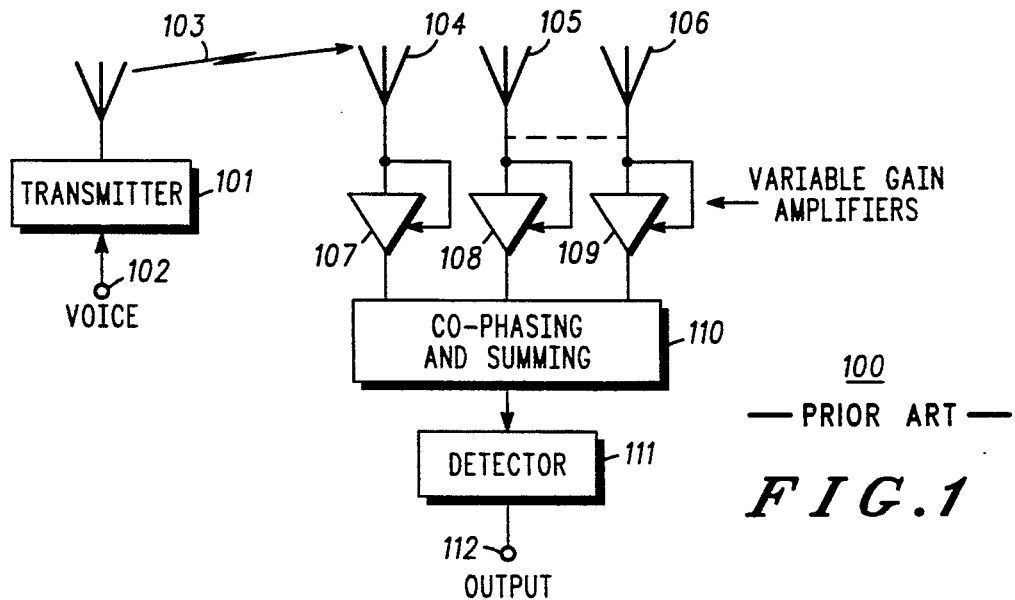
FIG. 1 illustrates a max-ratio combining technique of the prior art.

A max-ratio combining technique of the prior art is illustrated in FIG. 1 as generally depicted by the number 100. A voice signal (102) is applied to a transmitter (101) and the transmitted signal (103) is received over a plurality of diversity paths (104, 105 and 106). Each of these diversity input signals is scaled in a variable gain amplifier (107, 108 and 109) by an amount proportional to each individual signal power to noise power ratio. These diversity signals are adjusted so that they are in phase (co-phased). The co-phasing process in systems of the prior art is generally dependent upon a pilot tone included with the transmitted signal. After these co-phased and weighted diversity signals are summed (110), a detector (111) yields the system's best estimate of the transmitted voice signal at the output (112).

Figure 2:
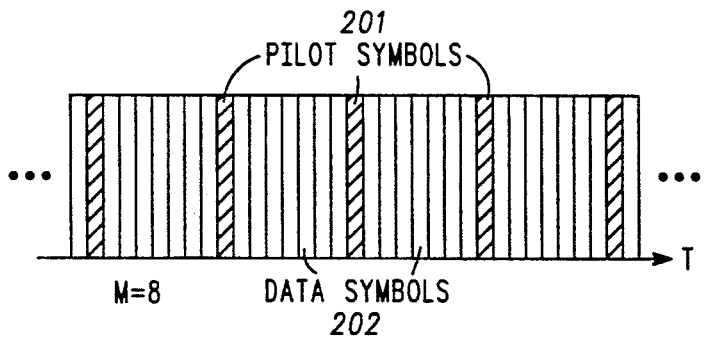
FIG. 2 illustrates pilot symbols interleaved with data symbols in a 16-QAM information stream.

In a 16-QAM system, as contemplated by the present invention, the frequency domain pilot tone of the prior art is abandoned in favor of a time domain pilot symbol. FIG. 2 illustrates the insertion of pilot symbols (201) in an input data symbol stream (202).

Figure 3:
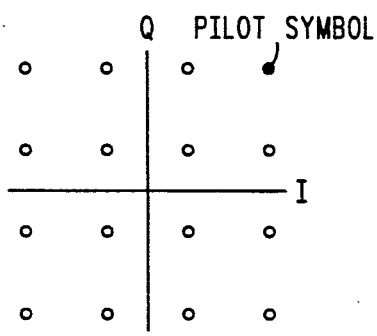
FIG. 3 is a 16-QAM signal constellation indicating a predetermined pilot symbol.

In a four-level modulation system as contemplated by the present invention, both in-phase and quadrature information symbols may have any one of four possible values. If in-phase and quadrature components are plotted in rectangular coordinates, this results in an array, or constellation as it is often called, of 16 possible values; thus the term "16-QAM." This signal constellation is illustrated in FIG. 3. It is often convenient, in fact, to consider in-phase and quadrature symbols as representing a complex number with the in-phase axis (which is labelled I in FIG. 3) analogous to the real number axis, and the quadrature axis (labelled Q in FIG. 3) analogous to the imaginary number axis. An arbitrary, although necessarily predetermined, pilot symbol is also indicated in the figure.

FIG. 4 is a block diagram of a receiver path designed to process QAM information symbols and pilot symbols using the method taught by the present invention. The receiver path is generally depicted by the number 400.

It is considered most advantageous to implement the method taught by the present invention in a digital radio system employing a digital signal processor (DSP). This, of course, is not necessary, but it makes the implementation much simpler. FIG. 4 shows a composite down-converted signal centered at DC as the input to a receiver pulse shaping filter (401). The input symbols are then sampled by a symbol sampler (402) at a predetermined rate, then pilot symbols and information symbols are separated and directed along different paths. Pilot symbols are directed along path 403 while information symbols are directed along path 404.

The first element depicted along the pilot symbol path (403) is a pilot sampler (405) which samples pilot symbols at predetermined times. The sampled pilot symbols are then multiplied by the inverse of the known pilot symbol in a mixer (406) in order to determine how the pilot symbols have been affected by the communication channel. The resulting estimate of the channel effect is known as the complex channel gain estimate. A pilot interpolation filter (408) provides estimates of the complex channel gain at the information symbol sampling times. This interpolation is necessary because pilot symbols were inserted in the information symbol stream only at widely spaced intervals, so the information symbol sampling rate is correspondingly much faster than the pilot symbol sampling rate.

Figure 5:
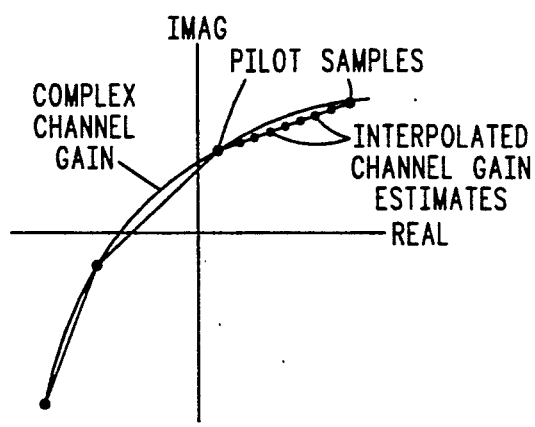
FIG. 5 illustrates interpolation of channel gain estimates in between pilot symbol sample times.

Turning briefly to FIG. 5, the complex channel gain is plotted in rectangular coordinates around orthogonal real and imaginary axes. FIG. 5 illustrates interpolated channel gain estimates between the pilot sample times.

Returning to FIG. 4, information symbols which are processed through the information symbol path (404), are first subject to a delay (407) to compensate for pilot sample processing that occurs in the pilot sample path (403). Each information symbol sample is multiplied in a multiplier (410) by the complex conjugate of the corresponding complex channel gain estimate illustrated in block 409. The phase corrected information signal, which is an output of the multiplier (410), is still weighted by channel effects. However, this weighting factor is closely approximately by the square of the amplitude of the complex channel gain illustrated in block 411. In a single receiver, the nominal thresholds predetermined by the four possible information symbol levels are adjusted by multiplication in a multiplier (412) with the square of the amplitude of the estimated complex channel gain (411). The phase corrected information symbols that form the output of the multiplier (410) are then subjected to a decision process (413) incorporating these adjusted thresholds to yield a best estimate of the transmitted information symbol at the output (414).

In practicing the present invention with a plurality of diversity receive paths, the phase corrected and weighted information symbol estimates from separate receive paths (601, 602 and 603 from FIG. 6) are summed in a summer (605) to provide a diversity combined information symbol estimate. An estimate of composite weighting factor is derived by summing the squares of the amplitudes of the estimated complex channel gains in another summer (604). The composite weighting factor is multiplied by the nominal thresholds to derive a set of adjusted decision thresholds, and the diversity combined information symbol estimate which is the output of the first summer (605) is subjected to a decision process (606) utilizing the adjusted decision thresholds to obtain estimates of the originally transmitted information symbols.

What is claimed is:

1. In an RF communication system using quadrature amplitude modulation (QAM), a method for implementing diversity reception to counteract effects of channel fading on a transmitted information signal, the method comprising the steps of:

at a transmitter:

(a) inserting, from time to time, one or more predetermined pilot symbols into a QAM information stream;

(b) modulating an RF carrier with the QAM information stream to provide a transmitted signal;

within two or more diversity receive paths:

(c) receiving the transmitted signal to provide a received signal;

(d) demodulating and appropriately sampling the received signal to provide a sampled demodulated signal;

(e) separating pilot symbol samples from information symbol samples in the sampled demodulated signal obtained in step (d);

(f) processing pilot symbol samples at predetermined pilot sample times to determine estimates of complex channel gain at each pilot sample time;

(g) interpolating complex channel gains determined in step (f) to compute complex channel gain estimates for each information symbol sample time;

(h) multiplying each information symbol sample by the complex conjugate of each corresponding complex channel gain estimate to provide a phase-corrected and weighted estimate of the transmitted information symbol, where the weighting is approximately the square of the amplitude of the complex channel gain;

(i) calculating the square of the amplitude of the estimated complex channel gain;

then, operating on outputs of said two or more diversity receive paths:

(j) summing the phase-corrected and weighted information symbol estimates to provide a diversity combined information symbol estimate;

(k) deriving an estimate of composite weighting factor by summing the squares of the amplitudes of the estimated complex channel gains;

(l) using the composite weighting factor determined in step (k) to derive a set of adjusted decision thresholds; and (m) comparing the diversity combined information symbol estimate provided in step (j) to the adjusted decision thresholds of step (l) to obtain estimates of the originally transmitted information symbols.

* * * * *